(No Model.) 3 Sheets—Sheet 2.
C. M. RISLEY.
PLANTER.
No. 556,588. Patented Mar. 17, 1896.
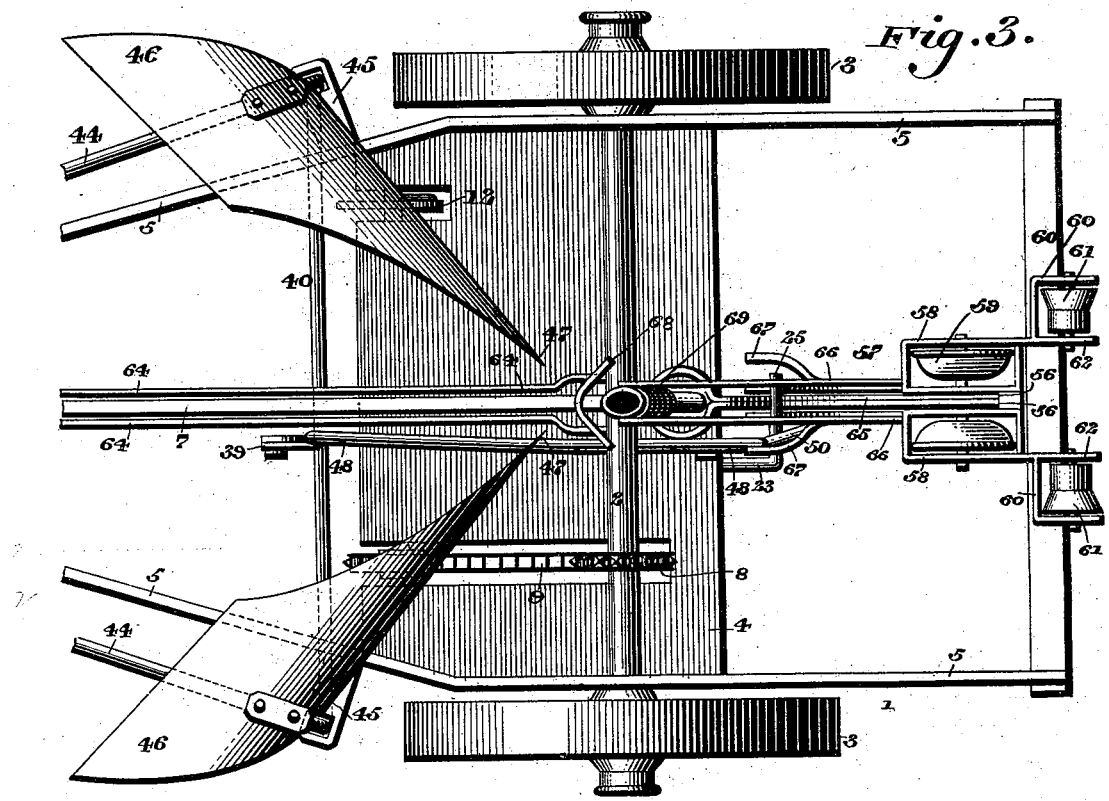
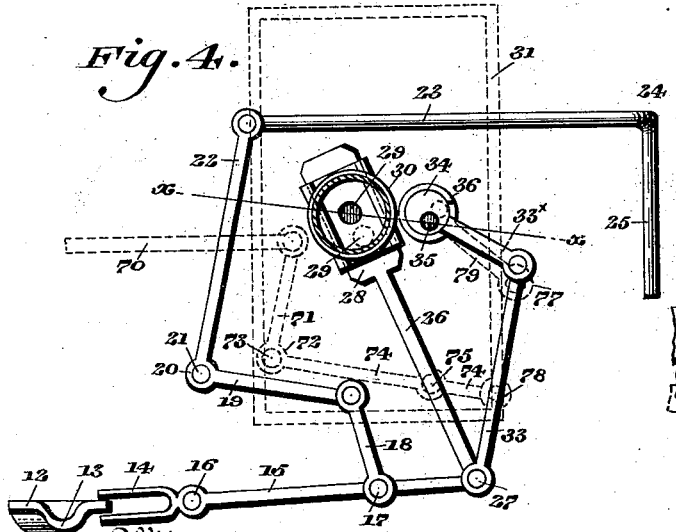
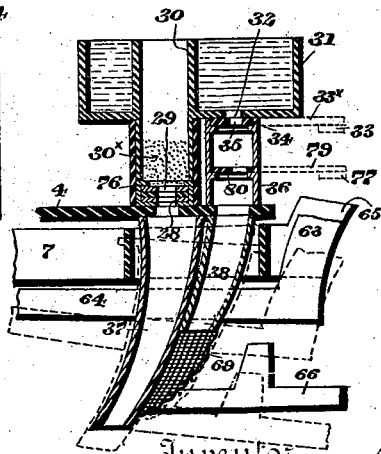
Witnesses
P. H. Aagle.
L. Douville.
Inventor
Caleb M. Risley
By [signature]
Attorney (No Model.)

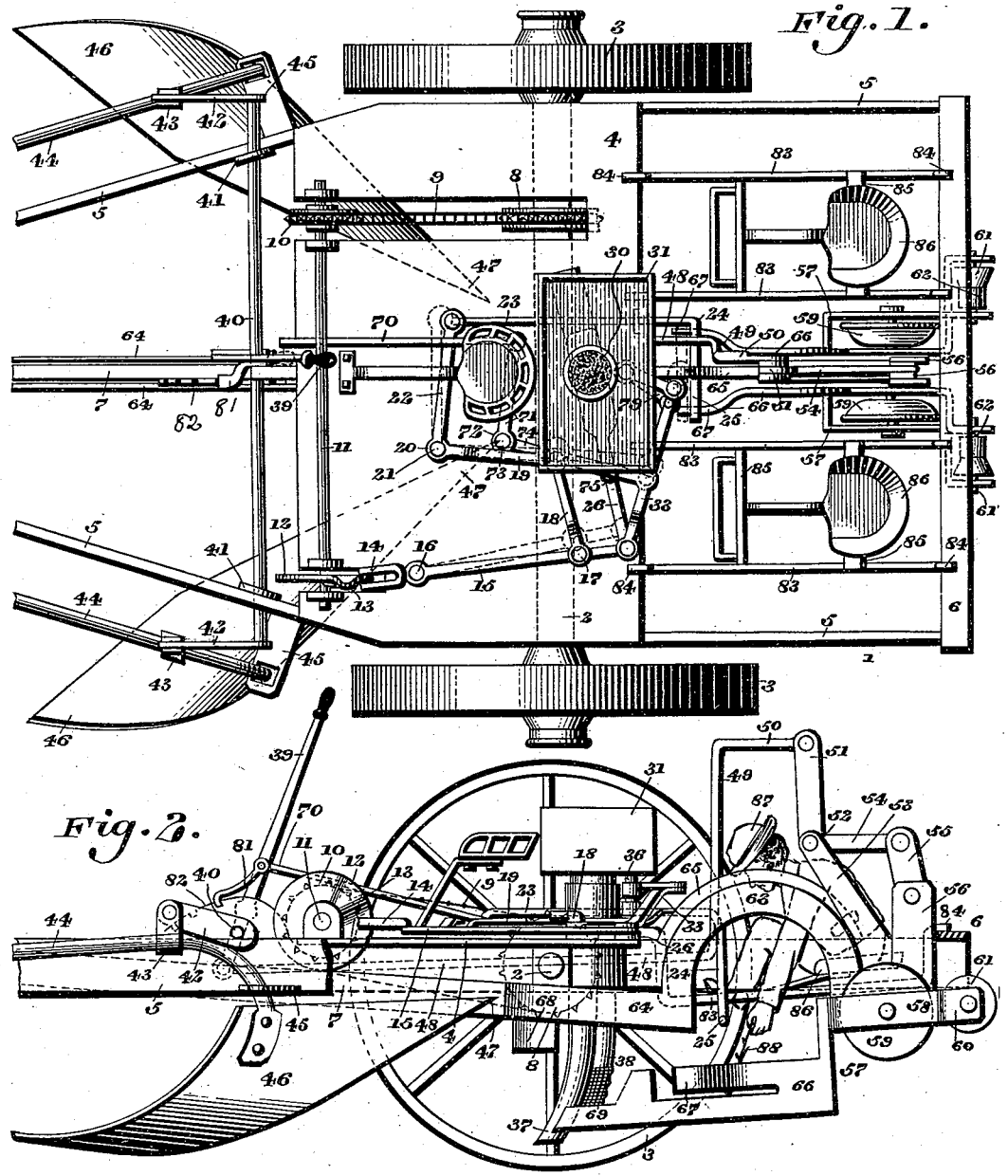

3 Sheets—Sheet 3.

C. M. RISLEY.
PLANTER.

No. 556,588. Patented Mar. 17, 1896.

UNITED STATES PATENT OFFICE.

CALEB M. RISLEY, OF WOODBURY, NEW JERSEY, ASSIGNOR OF ONE-HALF TO CHARLES E. VON STEGE, OF SAME PLACE.

PLANTER.

SPECIFICATION forming part of Letters Patent No. 556,588, dated March 17, 1896.

Application filed July 20, 1895. Serial No. 556,590. (No model.)

*To all whom it may concern:*

Be it known that I, CALEB M. RISLEY, a citizen of the United States, residing at Woodbury, in the county of Gloucester, State of New Jersey, have invented a new and useful Improvement in Planters, which improvement is fully set forth in the following specification and accompanying drawings.

My invention relates to planters; and it consists of a novel construction and arrangement of mechanism whereby sprouts or slips can be readily set or planted in large quantities, means being provided for mechanically making furrows or cavities in the soil for the reception of said sprouts or slips and for mechanically directing and applying thereto a suitable fertilizer and afterward applying water thereto, the sprouts having been once set in place requiring thereafter no further attention.

It also consists of a novel arrangement of mechanism whereby the plows and the furrowing device can be elevated and the supply of fertilizer and water to said furrows can be cut off or regulated when desired.

It also consists in making certain of the parts interchangeable and adjustable, which is especially desirable for doing certain kinds of work.

It further consists of novel details of construction, all as will be hereinafter set forth.

Figure 1 represents a plan view of a planter embodying my invention. Fig. 2 represents a side elevation of the same, certain of the parts being shown broken away. Fig. 3 represents a plan view of the bottom of the planter. Fig. 4 represents, on an enlarged scale, a plan view of a portion of the mechanism for automatically opening and closing the passages which admit the fertilizer and water to the furrows. Fig. 5 represents a section on line $xx$, Fig. 4. Fig. 6 represents, on an enlarged scale, a plan view of the under side of a portion of the planter, the parts being shown somewhat similar to the position seen in Fig. 3, certain portions of the apparatus, however, being moved from the positions therein shown. Fig. 7 represents a hill or ridge in the course of formation and the relation of the plows thereto during the progress of the planter. Fig. 8 represents a leveling device which follows the plow in the act of leveling the ridge. Fig. 9 represents the device for forming a furrow in said ridge. Fig. 10 represents the device which partially closes up said furrow. Fig. 11 represents the packing-rolls in the act of pressing the soil around the sprout or slip after the same has been placed in position.

Similar numerals of reference indicate corresponding parts in the several figures.

Referring to the drawings, 1 designates the body of the planter, the same having the axle 2 mounted in suitable bearings, upon which are the wheels 3, said body consisting of the side frames 5, which have the plate 4 extending across the same, said frames being braced in their rear portion by the cross-bar 6.

7 designates a centrally-located frame, to which in the present instance the frames 5 are attached at the forward portion, the point of attachment being shown broken away in the drawings.

8 designates a sprocket-wheel actuated by said axle 2, from which power is transmitted by the chain 9 to the sprocket-wheel 10, which is mounted on the shaft 11, which rotates in suitable bearings on the plate 4, said shaft having attached thereto the cam-disk 12, which has an offset or cam portion 13, said disk being adapted to contact with the forked end 14 of the lever 15, which is pivotally mounted at 16 on the plate 4 and has attached thereto at 17 an end of the link 18, whose other end is pivoted to the member 19 of the bell-crank 20, which is fulcrumed at 21 to the plate 4, the other member, 22, of said bell-crank being pivoted to the rod 23, which has the depending portion 24, to which is attached the laterally-extending arm or finger 25, which serves as a marker as it vibrates to indicate the point at which a sprout or slip should be set.

26 designates a lever which is pivoted at 27 to the lever 15, said lever 26 terminating in the enlarged portion 28, which has a hole 29 therein, the same thus having the function of a valve which is adapted to be moved into or out of alignment with the hole $29^\times$ in the lower portion of the conduit 30, which is adapted to receive a suitable fertilizer or phosphate $30^\times$. Surrounding the said conduit is a suitable receptacle 31, a portion of the base of which being provided with a port 32, said receptacle being adapted to be filled with water, as will be understood from Fig. 5.

33 designates a link which is pivoted to said lever 15 at one end, its other end being pivoted to an arm $33^\times$ of the disk or valve 34, which has a port 35 therein adapted to register with the port 32, said valve 34 resting on a suitable support in the conduit 36, which leads from the bases of the receptacle 31.

The relative position and operation of the above ports are best seen in Fig. 4 in full lines and also in Fig. 5, the means for cutting off the passage of the fertilizer $30^\times$ and the flow of water to the spouts 37 and 38, respectively, being seen dotted in Fig. 4, and will hereinafter be described, reference being had to Figs. 1 and 2.

39 designates a lever which is attached to a rock-shaft 40, the latter being rotatably mounted in the bearings 41, which are attached to the frames 5, as seen in Fig. 1.

42 designates arms rigidly attached to said rock-shaft 40 near the extremity of the same, said arms having the straps 43 secured thereto, through which the rods 44 pass, the forward ends of said rods 44 being pivotally attached to the forward portion of the frames 5 or 7, the point of attachment being broken away in Figs. 1, 2, and 3, while the rear ends of said rods are curved or bent downwardly and pass through slots in the guides 45, which are suitably supported on said side frame 5, said rods 44 having their bent ends attached to the plows 46, the same having their lower ends 47 bent and converged toward each other, as will be understood from the bottom plan view in Fig. 3.

The lower extremity of the lever 39 has pivotally attached thereto an end of the rod 48 which extends rearwardly and has the bent-up portion 49, from which extends rearwardly the arm 50, which is attached to the limb 51 of the bell-crank 52, which is pivoted to the supporting-arm 53, the other limb, 54, of said bell-crank being pivoted to the link 55, which is also pivoted to the portion 56 of the frame 57, the bottom plan view of which is seen in Figs. 3 and 6, the portions 56 being attached to the sides 58 of the rectangular or other shaped frames 57, in which the wheels or rollers 59 are journaled, the shape of the same being shown in Figs. 1, 3, and 6, said sides 58 having a rearward extension 60, in which the rollers 61 are adapted to be journaled, as seen in Fig. 3, while, if desired, the said rollers 61 can be journaled in the limbs 62 of said extensions in the manner seen in Fig. 6, which is desirable for certain kinds of work. The said sides 58 have suitably attached thereto the semicircular or arc-shaped portions 63, which extend upwardly, as seen in Fig. 2, and have attached to their forward ends the bars 64, which extend forwardly and have their front ends pivotally attached to the central frame 7, the point of attachment being shown broken away in the drawings, it being, however, understood that there are two of said bars 64 and two of said arc-shaped portions 63, one being on each side of the central stationary support 65, to which the arm 53 is attached, the portion 63 being omitted from Fig. 1 for clearness of illustration.

66 designates straight strips which extend forwardly from the frame 58 and have their forward ends attached to the spout 37, as seen in Figs. 2, 3, and 5, each of said strips 66 having a portion 67 cut and deflected outwardly therefrom, the function of which will be hereinafter explained.

68 designates a V-shaped plow or leveling device attached to the said bars 64.

69 designates a suitable strainer or sieve which covers the end of the water spout or outlet, it being noticed that said spouts 37 and 38 are attached to each other in such a way that they and the bars 64, strips 66, and frames 58 can all be lowered in unison by a movement of the lever 39, the relative positions the parts may assume being indicated in Fig. 5.

The mechanism for operating the cut-offs for closing the passages to the spouts 37 and 38 will now be described.

From the lever 39 extends rearwardly the arm 70, an end of which is pivoted to the member 71 of the bell-crank 72, which is pivoted at 73 to the plate 4, the other limb, 74, of said bell-crank having pivoted thereto at 75 a cut-off 75, which is directly over the lever 26 in the view seen in Fig. 1, its position being best seen in Fig. 5, the same being above the valve 28, although it might be under it, if desired, as is evident.

77 designates a link pivoted to the member 74 at the point 78, said link being pivoted to the arm 79 of the cut-off 80, which latter has a port therein adapted to register with its seat in the conduit 36, as will be understood from Fig. 5, the relative position of the ports being best seen by a comparison of Figs. 1, 4, and 5, it being remembered that the full lines in said Fig. 4 represent the levers, valves, &c., operated by the cam 12, while the dotted parts of said figure represent the cut-off devices operated by the lever 39.

81 designates a pawl on the lever 39, adapted to engage the ratchet 82.

83 designates rods which have their ends 84 bent upwardly and outwardly, so as to engage the plate 4 and cross-bar 6, said rods being braced by the cross-bars 85, to each of which a seat 86 is attached, upon which a boy 87 can sit, the same being shown in Fig. 2 in the act of inserting a plant or sprout 88 in position, said seats, rods, &c., being readily removed when desired, as seen in Fig. 3.

89 designates plows, which are to be attached to the frames 58 when desired, as seen in Fig. 6, when it is desired to perform certain kinds of work.

The operation is as follows: The rotation of the wheels 3 and the axle 2 as the planter progresses is imparted to the shaft 11 and the cam-disk 12 by means of the intermediate connections, as will be understood from Fig. 11, the rotation of said cam-disk 12 causing the forked lever 15 to vibrate upon its fulcrum 16, thereby alternately opening and closing the ports which admit the passage of the fertilizer and water through the spouts 37 and 38, respectively, as will be understood from Figs. 4 and 5, the spout 37 having the function of forming a furrow, as seen in Fig. 9, as will be explained. The vibration of the lever 15 will also cause the rod 23 of the finger or marker 25 to move backward and forward, said finger 25 thus indicating when the parts are properly adjusted the exact position where the sprout or slip 88 should be placed, as will be understood from Fig. 2. As the planter progresses the action of the pointed lower ends 47 of the plow 46 will tend to heap the soil into a ridge, as seen in Fig. 7, after which the leveling device 68 follows the same, leveling the soil, as seen in Fig. 8. Then follows the spout 37, which projects down into the ridge, as shown in Fig. 9, after which the portions 67 of the strips 66 follow, which serve to close up the furrow (shown in Fig. 9) just after the sprout or slip 88 is placed in position, as will be understood from Fig. 2, after which the packing wheels or rolls 59 come, the same causing the soil to be packed up closely around the sprout or slip 88, as will be understood from Fig. 11, it being of course understood that the operation of depositing the fertilizer and watering the same occur at the proper intervals, the device which affects the same being located between the leveling-plate 68 and the bent strips 67, the dirt being prevented from clogging up the spout 38 by reason of the sieve 69, it being understood further that the movement of the finger 25 assists in informing the boy 87, who is to be seated upon the seat 86, when the proper time arrives to insert the slip or sprout 88, which are to be placed in quantities in any suitable receptacle.

The movement of the valves which allow the deposition of the fertilizer and of the water is automatic, being caused by the cam-disk 12, as will be readily understood from Figs. 1 and 4.

If now it should be desired to throw the mechanism out of operation, the lever 39 is moved in the proper direction, whereupon the parts shown dotted in Fig. 4 and also in the plan view in Fig. 1 will operate to close the proper ports, as will be understood from Fig. 5, the location of the different cut-offs and valves being indicated therein, it being further understood that the same movement of the lever 39 which operates the arm 70 and the cut-offs also causes the partial rotation of the rock-shaft 40, thereby raising or lowering the arms 42, and also thereby the plows 46, and, further, by reason of the connections 48 and 49 of the bell-crank 52, as will be understood from Fig. 2, the spouts 37 and 38, the frame 66, the bars 64, and the leveling device 68 will be raised and lowered, according to whichever direction said lever 39 is actuated, the same being locked in the desired position by means of the pawl and ratchet 81 and 82.

The seats 86 can be removed, as is evident, and one only need be employed, if desired.

When it is desired to use the planter for other purposes than setting sprouts or slips, as described, the packing-rolls 59 are removed and the plows 89 inserted in place, the same being attached to the frames 58 by means of the ears 89$^\times$ or other suitable means, the rolls 61 being also transposed from the position seen in Fig. 6, the device in this position being especially applicable for planting potatoes or similar vegetables.

It will of course be evident that the size of the discharge-ports which lead from the conduit 30 for the fertilizer can be varied in any suitable manner, as by adjusting a pair of plates with respect to each other.

The spouts 37 and 38 are movable toward and away from the plate 4, as is evident from Fig. 5.

Having thus described my invention, what I claim as new, and desire to secure by Letters Patent, is—

1. In a planter, the spouts 37 and 38 for fertilizing and irrigating purposes respectively, said spout 37 being adapted to form a furrow, the strips 66 attached to one of said spouts, and provided with the devices 67 for closing up said furrow, in combination with the packing-rolls 59 journaled in the frames 58 attached to said strips, and means for raising and lowering the above parts when desired, substantially as described.

2. In a planter, the frame 1 consisting of the sides 5 and the plate 4, the axle 2 journaled in said frame, the axle 11 journaled on said plate, sprocket-wheels on said axles 2 and 11, a sprocket-chain connecting said wheels, fertilizing and irrigating receptacles with spouts, a cam-disk on said axle 11, and a lever connected with valves controlling the discharge from said receptacles actuated by the contact with said cam-disk, said parts being combined substantially as described.

3. In a planter, the frames 5, the plate 4 connected with said frames, the running-axle 2 mounted on said frames, and the axle 11 mounted on said plate, gearing connecting said axles, a cam-disk on said axle 11, the forked lever 15 pivoted to said plate and engaged by said cam-disk, the bell-crank 20, connected at one limb by the link 18, to said lever 15, the rod 23 pivoted to the other limb of said bell-crank, said rod 23 having a depending portion with a laterally-extending finger, said parts being combined substantially as described.

4. In a planter, a main frame with the sides 5, a rocking shaft mounted on said sides and having the arms 42 with the straps 43 pivoted thereto, the rods 44 pivotally attached at the forward ends to the sides 5 and passing through said straps, the guides 45 secured to said sides, and the plows 46 attached to said rods, said parts being combined substantially as described.

5. In a planter, the plows 46, the spouts 37 and 38, the bars 64, the frames 63 and 58, the strips 66 having the outwardly-bent portions 67, said strips being attached to said spouts, and a leveling device, in combination with means for throttling the passages to said spouts, and for actuating the above parts in unison, substantially as described.

6. In a planter, the plows 46 having their ends pointed and converging as described, means for raising and lowering said plows, a leveling device suitably supported, the spouts 37 and 38, a marker, means for actuating the same, the rearwardly-extending strips attached to said spouts, devices supported on said strips for closing up the furrow, the packing-rolls 59 and supporting-frames therefor, substantially as described.

7. In a planter, the receptacle 31, the conduit 30 adjacent thereto, spouts in communication therewith, the rearwardly-extending strips attached to one of said spouts, and having the bent plates 67 attached thereto, the frames 58 attached to said strips, the extensions 62 attached to said frames and the interchangeable rolls 61 adapted to be mounted in said extensions, substantially as described.

8. In a planter, the spouts 37 and 38, the rearwardly-extending strips 66 attached thereto, the bent plates 67 attached to said strips, the frames 58 attached to the latter, the plows 89 attached to said frames, the extensions 62 attached to the latter, and the interchangeable rolls 61 mounted in said extensions, substantially as described.

9. In a planter, the spouts 37 and 38 for fertilizing and irrigating purposes, the former being adapted to form a furrow, the rearwardly-extending strips 66 attached to one of said spouts, the bent plates 67 attached to said strips, the frames 58, also attached to the latter, the packing-rolls 59 journaled in said frames, means for supporting the latter, and means for raising and lowering the above parts in unison, substantially as described.

CALEB M. RISLEY.

Witnesses:
A. W. CATTELL,
E. C. TALMAN.